No. 806,467. PATENTED DEC. 5, 1905.
W. FELD.
PROCESS OF RECOVERING AMMONIA AND HYDROCYANIC ACID.
APPLICATION FILED JAN. 30, 1904.
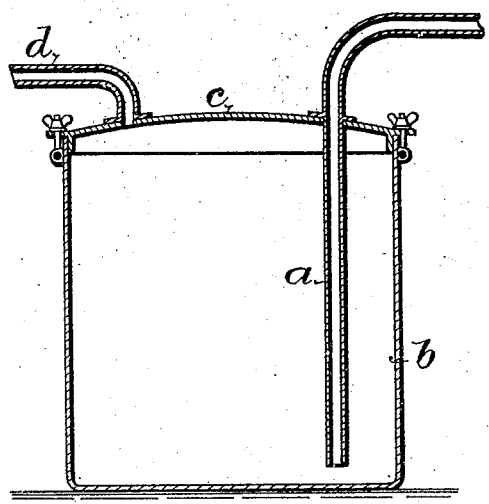

UNITED STATES PATENT OFFICE.

WALTHER FELD, OF HÖNNINGEN-ON-THE-RHINE, GERMANY.

PROCESS OF RECOVERING AMMONIA AND HYDROCYANIC ACID.

No. 806,467.     Specification of Letters Patent.     Patented Dec. 5, 1905.

Application filed January 30, 1904. Serial No. 191,372.

*To all whom it may concern:*

Be it known that I, WALTHER FELD, a subject of the King of Prussia, German Emperor, residing at Hönningen-on-the-Rhine, Province of the Rhine, Kingdom of Prussia, German Empire, have invented a new and useful process for the simultaneous recovery of ammonia and hydrocyanic acid from gases containing the same and the partial regeneration of the agents employed in the recovery.

In order that my invention may be understood and practiced by those skilled in the art, I give the following specification thereof.

The invention relates to processes for the recovery of ammonia and hydrocyanic acid from gases containing the same, and has for its object the simultaneous recovery of both the gases mentioned.

Hitherto processes for the treatment of gases containing ammonia and hydrocyanic acid, while more or less effective in recovering all or nearly all of the hydrocyanic acid present, have resulted in the absorption of part only of the ammonia, with the formation of soluble and insoluble ammonia iron cyanids, the ammonia in the gas acting as an alkaline absorbing agent to the cyanogen. By such processes the ammonia is recovered as four different compounds and it requires two different apparatus and operations, one for the recovery of the cyanogen and part of the ammonia and the other for the recovery of the rest of the ammonia. Furthermore, by the influence of free ammonia and of basic ammonia compounds (carbonate, sulfid, and cyanid) part of the cyanogen has been lost by the formation of sulfocyanid, especially in the treating of gases which contain comparatively much oxygen besides sulfureted hydrogen, such as gases from coking-ovens and blast-furnaces.

The process, according to my present invention, has for its object to enable practically the whole quantity of ammonia and of hydrocyanic acid present in the gases to be recovered in one operation and to avoid the formation of sulfocyanids by neutralizing the whole of the free ammonia and the basic ammonia compounds and forming neutral ammonia salts immediately the gas comes into contact with the absorbing means and by absorbing the whole of the hydrocyanic acid in the same solution, forming an iron-cyanogen compound. For this purpose the gases are treated with a liquid containing an iron compound or compounds, (especially ferrous compounds,) together with salts, as hereinafter explained, in such proportions that for each six molecules of cyanogen in the gas at least one atom of iron is used and that for each molecule of ammonia in the gas there is used at least one non-atomic equivalent of a salt which will be decomposed by free ammonia alone or by ammonia in the presence of carbonic acid, sulfureted hydrogen, or hydrocyanic acid, in yielding the corresponding neutral ammonia salt and the basic compound of the metal of the salt used. These salts are the acid and neutral salts of non-basic reaction of the alkalies, earth alkalies, and magnesia, and of those metallic earths and metals which are decomposed by basic ammonia compounds, (ammonium hydroxid, ammonium carbonate, sulfid, and cyanid.) To absorb the whole of the cyanogen in the gas, it is necessary for the gas to contain at least four molecular proportions of ammonia to every six molecular proportions of hydrocyanic acid if a basic iron compound, such as iron hydroxid or iron carbonate, be used, together with the salt, according to the following equation:

(1) $4NH_3 + 6HCN + Fe(OH)_2 + 2MgCl_2 =$
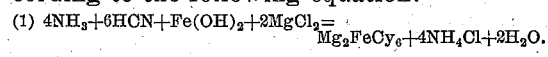
$Mg_2FeCy_6 + 4NH_4Cl + 2H_2O.$ If a neutral iron compound be used, there must be in the gas to every six molecular proportions of cyanogen at least six molecular proportions of ammonia, according to the following equation:

(2) $6NH_3 + 6HCN + FeSO_4 + 2MgCl_2 =$
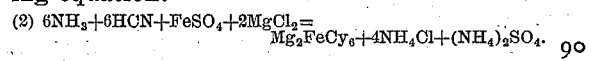
$Mg_2FeCy_6 + 4NH_4Cl + (NH_4)_2SO_4.$ If there be less ammonia in the gas, ammonia must be added to it, or an equivalent of another basic material may be introduced with the salt solution. I may add the required additional ammonia to the gas before washing it, or I may add the said ammonia to the solution used for washing. If there be more ammonia than the equivalent of the hydrocyanic acid, the ammonia will be absorbed by decomposition of the salt used, according to the equation:

(3) $2NH_3 + MnSO_4 + 2H_2O = (NH_4)_2SO_4 + Mn(OH)_2,$
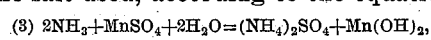

and if a salt of an alkali or earth alkali or of magnesia be used the excess of ammonia will be absorbed by the simultaneous reaction of the salt and the carbonic acid in the gas upon the ammonia, according to the following equation:

(4) $2NH_3 + MgCl_2 + CO_2H_2O = MgCO_3 + 2NH_4Cl.$
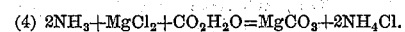

Should there be less carbonic acid in the gas than is equivalent to the excess of ammonia, then carbonic-acid gas or gases containing carbonic acid may be added to the gas, or the salt solution may be treated with carbonic acid or a bicarbonate may be added to the salt solution:

(5) $2NH_3 + MgCl_2 + Mg(HCO_3)_2 = 2MgCO_3 + 2NH_4Cl$.

In any case besides the iron compound, equivalent to the hydrocyanic acid, so much of the other salt must be used that the whole of the ammonia is absorbed to form a neutral salt. An excess of absorbing means, the iron compound, the salt, and of carbonic acid is not objectionable. The solution after having been used for washing the gases contains in the form of a neutral salt all the ammonia of the gas treated and also it contains iron-cyanogen compounds, and (according to the nature of the salt used) the hydrates or carbonates, or, if sulfureted hydrogen was present in the gas, the sulfids of the metal of the salt.

It is preferable to treat the gases with the absorbing solution before the gases are cooled below 30° centigrade. The solution can be used warm without interfering with the completeness of the absorption. According to the concentration of the solution the insoluble compounds are from time to time filtered off, if necessary, after precipitating the ferrocyanid and adding an iron compound. Thus the cyanid is obtained as Prussian blue or as an insoluble alkaki—earth alkali—or magnesia ferrocyanid or double ferrocyanid, such as calcium-iron ferrocyanid, $(CaFe_2Cy_6,)$ and the like.

Suitable salts for use in conjunction with an iron compound in carrying out this invention are acid and neutral salts of a non-basic character, such as the haloid salts, the sulfates, the sulfites, the phosphates, nitrates, and similar salts of an alkali, earth alkali, magnesia, the metallic earths, or of the metals, alone or mixed together.

For further explaining my invention more clearly I give the following specific example, in which a mixture of calcium chlorid and ferrous sulfate is used as the absorbing means for washing the gas. The calcium chlorid used in the process may be recovered from the waste liquors.

Example: Let it be presumed that coal-gas of normal composition is to be treated containing in one hundred cubic meters about two thousand grams of carbon dioxid, fifteen hundred grams of sulfureted hydrogen, three hundred and forty grams of ammonia, and one hundred and fifty-six grams of hydrocyanic acid. Such coal-gas shows a ratio of six molecular proportions of hydrocyanic acid to twenty molecular proportions of ammonia and forty-five molecular proportions of carbon dioxid. For absorbing the amount of ammonia present in such gas ten molecular proportions of calcium chlorid are required, bearing in mind that it is preferable to use a slight excess of calcium chlorid. For absorbing the hydrocyanic acid present in the gas one molecule of a bivalent ferrous compound is required. When calcium chlorid and ferrous sulfate are used for washing the gas, the following reactions will occur:

(6a) $6NH_3 + 6HCN + 3CaCl_2 + FeSO_4 = Ca_2Fe(CN)_6 + 6NH_4Cl + CaSO_4$, (6b) $14NH_3 + 7CO_2 + 7CaCl_2 + 20H_2O = 14NH_4Cl + 7CaCO_3 + 13H_2O$ or (6c) $20NH_3 + 6HCN + 7CO_2 + 10CaCl_2 + FeSO_4 + 20H_2O = Ca_2Fe(CN_6) + 20NH_4Cl + 7CaCO_3 + CaSO_4 + 13H_2O$.

If after finishing the reaction there is an excess of ammonium chlorid, this may react upon the calcium ferrocyanid, which then is precipitated as calcium-ammonium ferrocyanid, $Ca(NH_4)_2FeCy_6$.

(7) $Ca_2FeCy_6 + 6NH_4Cl = Ca(NH_4)_2FeCy_6 + CaCl_2 + 4NH_4Cl$.

In order to recover the whole of the ammonia and of the hydrocyanic acid present in one hundred cubic meters of the gas mentioned, at least two hundred and eighty grams of ferrous sulfate $(FeSO_4,7H_2O)$ and from one thousand to thirteen hundred grams of calcium chlorid are required. Having ascertained the amount of compounds present in the gas, I calculate according to the last foregoing equations the amount of chemicals necessary for washing the gas, and then I take this calculated quantity of the chemicals—according to the present example two hundred and eighty grams of ferrous sulfate $(FeSO_4.7H_2O)$ and from one thousand to thirteen hundred grams of calcium chlorid—and I dissolve the said chemicals in water. I have found it suitable to prepare a solution of such a concentration that after having finished the washing process I obtain a solution containing about five per cent. of ammonia, (in the form of ammonium chlorid.) For this purpose I use about seven liters of water for the above-mentioned quantity of absorbing substances. I may use a larger or smaller quantity of water for dissolving the salts; but their quantity is not diminished. The skilled operator will determine the degree of concentration most suitable for his particular purpose.

In the accompanying drawing I have illustrated an apparatus suitable for carrying out my invention.

The solution of the absorbing salts is charged into a suitable vessel $b$, which may be of cylindrical form and closed by a lid $c$. The gas to be treated is introduced into the vessel and caused to flow through the absorbing solution through the pipe $a$, the gas afterward passing out by means of pipe $d$, through which it may be conducted to a suitable collecting-chamber or gas-holder or directly to the place where it is intended to be used, or if the gases are not intended to be used they may be allowed to escape from the pipe $d$. After the washing process has been finished there remains in the vessel $b$ a solution of sludge having a faint odor of coal-gas. Said solution is practically free from sulfureted hydrogen, which is not soluble in the said solution, and said solution contains about four per cent. calcium ferrocyanid ($Ca_2FeCy_6$) or calcium-ammonium ferrocyanid, fifteen per cent. ammonium chlorid, ($NH_4Cl$,) ten per cent. calcium carbonate, ($CaCO_3$,) and 1.5 per cent. calcium sulfate, ($CaSO_4$,) the two last-named substances being mostly undissolved. The sludge or solution in the washer or vessel is then heated to distil off ammonia and to regenerate the salt used for its absorption. This may be carried out in the vessel $b$ by introducing steam and leading away the gases formed by the action of the heating process through the pipe $d$, or, if desired, I may discharge the solution and sludge from the vessel $d$ and carry out the heating process in another suitable vessel, or instead of introducing steam to the vessel $b$ I may heat the mixture therein directly by a flame or in any other suitable way. The skilled operator will employ the method for this part of the process best suited to the special conditions under which he works. Before or during the heating process I may add calcium hydroxid in the quantity as indicated by the following equation:

(8) 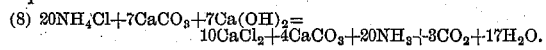
$20NH_4Cl + 7CaCO_3 + 7Ca(OH)_2 = 10CaCl_2 + 4CaCO_3 + 20NH_3 + 3CO_2 + 17H_2O$.

An excess of calcium hydroxid over the amount indicated in the above equation is not objectionable, but is not necessary. From the mass thus freed from ammonia I may separate the cyanogen compounds if the solution be of suitable concentration (which I may obtain by evaporating the water or by repeatedly using the mass for washing the gas) by adding a suitable iron compound—for instance, a ferric or ferrous compound—by which the cyanogen is precipitated in the form of Prussian blue or calcium-iron ferrocyanid. The precipitate obtained may be separated from the solution by filtering, decantation, or the like. If the cyanogen be obtained in the form of insoluble compounds in the sludge coming from the washer or vessel, I may separate the same from the ammonia liquor by filtration before heating and distilling off the ammonia. After the ammonia has been distilled off and the calcium chlorid has been regenerated by the distilling process I may use the warm solution for another washing operation after having added the iron compounds necessary for absorbing the hydrocyanic acid in the gas to be treated. I have found that the warmer the liquor containing the absorbing substances is during the washing operation the purer will be the solution of ammonia salt and the ferrocyanid resulting from the process. I have found that a temperature of from 30° to 60° centigrade is very suitable for the purposes of my invention, ammonium sulfid being dissociated at above 30° centigrade, and therefore with the liquid of 30° centigrade and higher no ammonium sulfid, and therefore no polysulfid and no sulfocyanid, can be formed. I therefore prefer to wash the gas before it has been cooled below 30° centigrade in order to avoid the formation of sulfocyanid compounds in the gas before it comes into contact with my washing solution. The recovery of the ammonia and cyanogen can, however, be effected even if the gas be washed with the mixture of iron compounds and the salts according to my invention at a temperature below 30° centigrade.

Having set forth and described my invention and the manner of practicing the same, what I claim, and desire to secure by Letters Patent, is—

1. A process for simultaneously recovering ammonia and cyanogen from gases containing the same, which consists in treating said gases with a liquid containing an iron compound and a salt in the proportions substantially as specified, said iron compound being of a character to react with the cyanogen present in the gas and form therewith an iron-cyanogen compound, and said salt being of a non-basic character and having the property of reacting with ammonia in the presence of hydrocyanic acid to form therewith a neutral ammonia compound, whereby the hydrocyanic acid and the ammonia are absorbed by the iron compound and the salt respectively.

2. A process for simultaneously recovering ammonia and cyanogen from gases containing the same, which consists in treating said gases with a liquid containing a non-acid iron compound and a salt in the proportions substantially as specified, said non-acid iron compound being of a character to react with the cyanogen present in the gas and form therewith an iron-cyanogen compound, and said salt being of a non-basic character and having the property of reacting with ammonia in the presence of hydrocyanic acid to form therewith a neutral ammonia compound, whereby the hydrocyanic acid and the ammonia are absorbed by the iron compound and the salt respectively.

3. A process for simultaneously recovering ammonia and cyanogen from gases containing the same, which consists in treating said gases with a liquid containing a non-acid ferrous compound and a salt in the proportions substantially as specified, said iron compound being of a character to react with the cyanogen present in the gas and form therewith an iron-cyanogen compound, and said salt being of a non-basic character and having the property of reacting with ammonia in the presence of hydrocyanic acid to form therewith a neutral ammonia compound, whereby the hydrocyanic acid and the ammonia are absorbed by the iron compound and the salt respectively.

4. A process for simultaneously recovering ammonia and cyanogen from gases containing the same, which consists in treating said gases with a liquid containing an iron compound and a salt in the proportions substantially as specified, and at a temperature above 30° centigrade or thereabout, said iron compound being of a character to react with the hydrocyanic acid present in the gas and form therewith an iron-cyanogen compound, and said salt being of a non-basic character and having the property of reacting with ammonia in the presence of hydrocyanic acid to form therewith a neutral ammonia compound, whereby the hydrocyanic acid and the ammonia are absorbed by the iron compound and the salt respectively.

5. A process for simultaneously recovering ammonia and cyanogen from gases containing the same, which consists in treating said gases with a liquid containing an iron compound and a salt in the proportions substantially as specified, said iron compound being of a character to react with the hydrocyanic acid present in the gas and form therewith an iron-cyanogen compound, and said salt of a non-basic character which is capable of reaction with basic ammonia compounds and forming therewith a neutral ammonia compound in the presence of cyanogen, whereby the whole of the cyanogen present in the case is absorbed by the iron compound and the whole of the ammonia is absorbed by the said salt.

6. A process for simultaneously recovering ammonia and cyanogen from gases containing the same, which consists in treating said gases with a liquid containing a ferrous compound and a salt in the proportions substantially as specified, said iron compound being of a character to react with the cyanogen present in the gas and form therewith an iron-cyanogen compound, and said salt of a non-basic character and having the property of reacting with the ammonia in the presence of cyanogen and forming with the ammonia a neutral ammonia compound, treating the sludge to distil off and recover the ammonia, then treating the residue thus freed from ammonia with a precipitant to precipitate the iron-cyanogen compound formed.

In witness whereof I have hereunto signed my name, this 16th day of January, 1904, in the presence of two subscribing witnesses.

WALTHER FELD.

Witnesses:
 WOLDEMAR HAUPT,
 HENRY HASPER.